US009098249B2

(12) United States Patent
Vega et al.

(10) Patent No.: US 9,098,249 B2
(45) Date of Patent: Aug. 4, 2015

(54) TOOLLESS HOT SWAPPABLE STORAGE MODULE

(71) Applicant: RPX Corporation, San Francisco, CA (US)

(72) Inventors: Michael J. Vega, Longmont, CO (US); Kevin Lee Van Pelt, Longmont, CO (US)

(73) Assignee: RPX Corporation, San Francisco, CA (US)

( * ) Notice: Subject to any disclaimer, the term of this patent is extended or adjusted under 35 U.S.C. 154(b) by 78 days.

(21) Appl. No.: 13/931,815

(22) Filed: Jun. 29, 2013

(65) Prior Publication Data

US 2014/0268539 A1    Sep. 18, 2014

Related U.S. Application Data

(60) Provisional application No. 61/780,872, filed on Mar. 13, 2013.

(51) Int. Cl.
  *H05K 5/00* (2006.01)
  *G06F 1/18* (2006.01)
  *G11B 33/00* (2006.01)
  *G11B 33/12* (2006.01)

(52) U.S. Cl.
  CPC *G06F 1/18* (2013.01); *G11B 33/00* (2013.01); *G11B 33/126* (2013.01)

(58) Field of Classification Search
  CPC .................................................. H05K 7/1418
  USPC ......................................................... 361/756
  See application file for complete search history.

(56) References Cited

U.S. PATENT DOCUMENTS

| 3,133,768 | A | 5/1964 | Klakovich | |
|---|---|---|---|---|
| 6,318,679 | B1 | 11/2001 | Yang et al. | |
| 6,422,399 | B1 * | 7/2002 | Castillo et al. | 211/26 |
| 6,497,465 | B1 | 12/2002 | Baker et al. | |
| 7,215,556 | B2 * | 5/2007 | Wrycraft | 361/802 |
| 7,218,526 | B2 | 5/2007 | Mayer | |
| 7,363,640 | B2 | 4/2008 | Wang et al. | |
| 7,675,742 | B2 | 3/2010 | Wu et al. | |
| 7,823,994 | B2 | 11/2010 | Yang et al. | |
| 8,174,835 | B2 * | 5/2012 | Kim et al. | 361/737 |

(Continued)

OTHER PUBLICATIONS

U.S. Appl. No. 14/082,090, Lance M. Evans, Bidirectional Slide Rail, filed Nov. 15, 2013.

(Continued)

*Primary Examiner* — Forrest M Phillips
(74) *Attorney, Agent, or Firm* — Withrow & Terranova, PLLC

(57) ABSTRACT

A toolless hot-swappable storage module system includes a base plate for mounting within a computer enclosure and a toolless hot-swappable storage module. The storage module includes a sled that is removably coupled to the base plate. The storage module further includes a printed circuit board (PCB) that is disposed on the sled. The PCB includes a plurality of storage media connectors, a PCB signal and power connectors. The storage module also includes a support frame disposed on the PCB. The support frame includes a plurality of support members that are disposed perpendicular to the PCB. Each support member has a first edge and a second edge and includes a plurality of dividers disposed in parallel rows. The support frame also includes a sidewall that is disposed across the first edge of the support members.

14 Claims, 3 Drawing Sheets

(56) References Cited

U.S. PATENT DOCUMENTS

| | | | |
|---|---|---|---|
| 8,760,873 B2 * | 6/2014 | Salles | 361/730 |
| RE45,034 E * | 7/2014 | Babin | 361/759 |
| 8,902,601 B2 * | 12/2014 | Trotman et al. | 361/754 |
| 2001/0040142 A1 | 11/2001 | Haney | |
| 2003/0205539 A1 | 11/2003 | Lauchner et al. | |
| 2007/0086172 A1 | 4/2007 | Lai et al. | |
| 2007/0175835 A1 | 8/2007 | Liang | |
| 2008/0035588 A1 | 2/2008 | Liang | |
| 2008/0217497 A1 | 9/2008 | Yang et al. | |
| 2010/0265651 A1 | 10/2010 | Huang et al. | |
| 2011/0100933 A1 | 5/2011 | Kitten | |
| 2012/0099284 A1 * | 4/2012 | Boetzer | 361/754 |
| 2012/0161599 A1 | 6/2012 | Chen et al. | |
| 2014/0265793 A1 | 9/2014 | Evans | |

OTHER PUBLICATIONS

U.S. Appl. No. 14/082,090 Office Action mailed Oct. 16, 2014.

* cited by examiner

TOOLLESS HOT SWAPPABLE STORAGE MODULE

CROSS REFERENCE TO RELATED APPLICATIONS

This application claims the priority benefit of U.S. Provisional Application Ser. No. 61/780,872, titled "SERVER WITH HEAT BAFFLE COOLING," filed Mar. 13, 2013, the disclosure of which is incorporated herein by reference.

BACKGROUND

1. Field of the Invention

The present invention relates to housing data storage media. More specifically, the present invention relates to a modular storage system with storage modules that are both toolless and hot-swappable.

2. Description of the Related Art

Previously attempted storage systems have attempted to store media in storage modules, but they lack a number of desirable attributes. Previously attempted storage modules are plagued by single points of failure that can cause an entire data storage system to fail and require servicing. Specifically, sometimes a printed circuit board (PCB) failure may cause every storage media connected to it on the PCB to stop functioning. In such cases, the PCB must be serviced quickly and efficiently to get the storage media back up and running.

Storage modules are typically fixed within data storage system enclosures by fastening hardware such as screws or pins. With previously attempted storage modules solutions, the only way to service a PCB issue is to shut down the entire data storage system and use a tool to painstakingly remove each of the many fasteners. Doing so commonly requires at least thirty minutes of manual labor, during which time every storage medium in the storage module must remain out of commission.

Additionally, because the entire data storage system must be shut down, every other storage medium in the greater data storage system must be temporarily shut down as well, even if they are located on an entirely different PCB or in an entirely different storage module. Some data storage systems power and communicate with over seventy storage media at one time. As a result, when a user must shut down an entire enclosure, dozens of data storage customers may be adversely affected in a single instance. Having to shut down an entire data storage system due to a single PCB failure is an extremely costly and time consuming side effect associated with previously attempted storage module solutions.

Previously attempted storage module solutions also lack the ability to be transported and shipped easily and efficiently. Because data storage systems commonly house over seventy storage media at once, they are extremely heavy. Some systems weigh over two hundred pounds and, under OSHA regulations, can only be lifted and transported using a forklift. Data storage systems are also cumbersome and expensive to ship due to their weight. When using previously attempted storage module systems, this excessive weight has to be reduced prior to shipping; namely, a user must manually remove the storage media individually, a task that requires extensive time and manual labor—particularly in systems containing over seventy such media. Allowing the multiple storage media to be removed easily in a storage module also allows the modules to be easily removed and securely stored for security purposes if required When the storage media are ready to be plugged back in, previously attempted storage module solutions enhance the risk that every medium will need to be reconfigured whenever redundant array of independent disks (RAID) sets have been configured across media. For example, if a medium is re-inserted into the PCB in the wrong location and the system is powered up, the RAID sets will need to be reconfigured. Potentially having to reconfigure RAID sets across numerous storage media after shipping a data storage system is an extremely time consuming and generally disadvantageous feature of previously attempted storage module solutions.

Lastly, most data storage units are designed such that the storage media may only be accessed by removing the storage media through the front of the unit. Such units only give users access to one layer of storage.

In short, there is a need in the art for a storage module system that gives users better access to storage media and allows them to quickly and efficiently remove storage media and their corresponding PCBs for service and shipping or security purposes.

SUMMARY

The storage module system of the present invention provides for improved housing of data storage media. The storage module features an attachment system that allows it to be inserted into and removed from a greater data storage system enclosure quickly and efficiently, is hot-swappable, and can be removed without the use of tools or the need to remove fastening hardware. The storage module system includes a base plate that is attached to the enclosure and a sled that is attached to the bottom of the storage module. The base plate and the sled include any one of a variety of toolless attachment mechanisms, such as corresponding rails or bearings. The storage module is also hot-swappable, meaning it can be removed from the greater data storage system without having to shut down the greater data storage system or the storage module itself if configured correctly. The storage module includes a printed circuit board that is disposed on the sled. The PCB includes a plurality of storage media connectors, a PCB signal plug-in connector, and a power connector that provides the storage module with its hot-swappable characteristic and helps to eliminate single points of failure within the greater data storage system.

DETAILED DESCRIPTION

Figure 1:
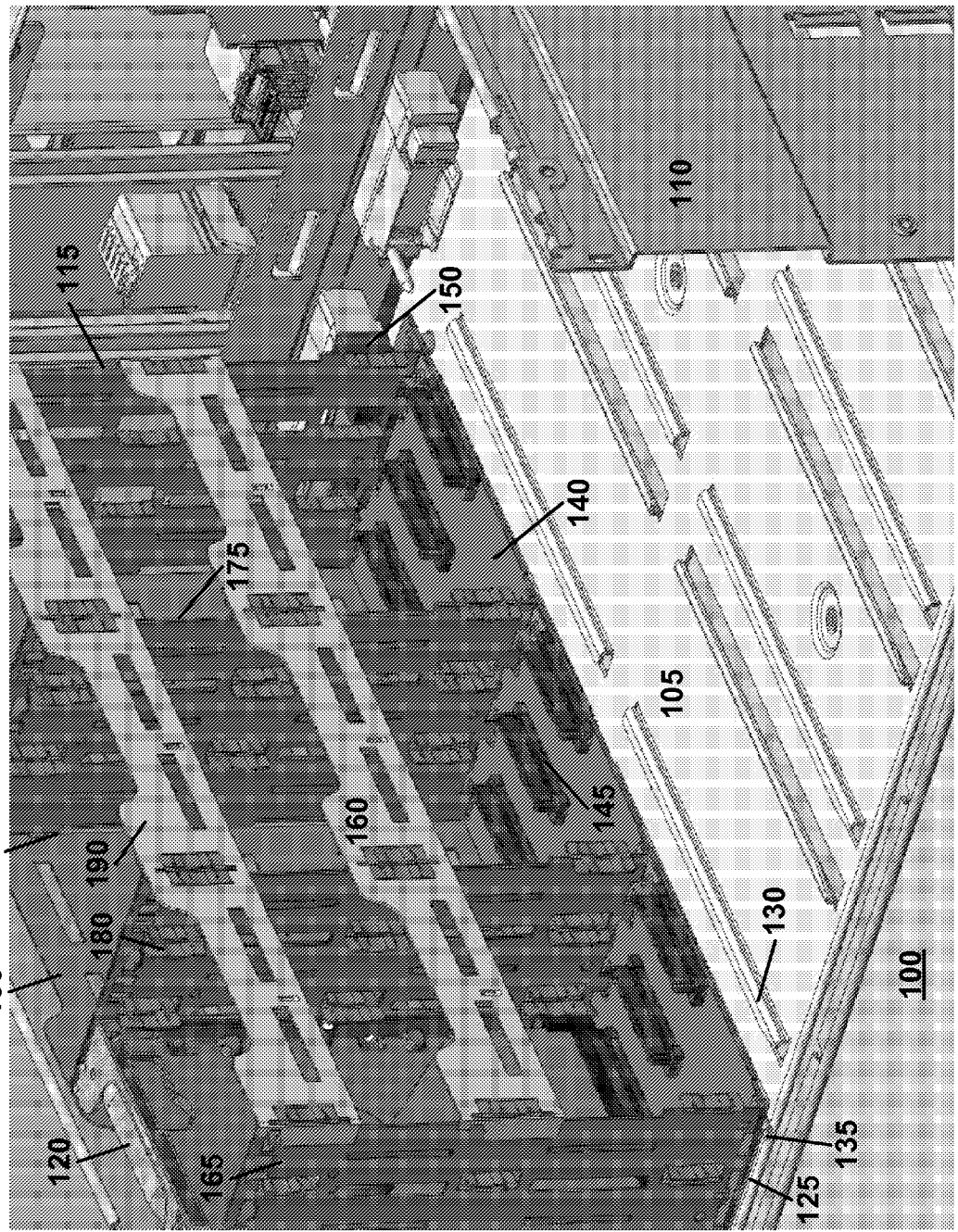
FIG. 1 is a perspective view of an exemplary toolless hot-swappable storage module system in accordance with the present invention.

A toolless hot-swappable storage module system is provided. The storage module system of the present invention provides for improved housing of data storage media. The storage module is both toolless and hot-swappable. As a result, it may be quickly inserted into and removed from a greater data storage system enclosure without having to use tools or shut down the module or the data storage system. These features are extremely advantageous because they allow for quick and efficient service operations in the event of PCB failures. Among other advantages, the modular form of the present invention also makes data storage systems more reliable by eliminating single points of failure and making storage media easier to ship to customers.

As noted above, the storage module system may be utilized in greater data storage systems. The greater data storage system may include a computer enclosure. Although data storage systems are discussed herein for illustrative purposes, the present technology may be useful in other computer systems as well.

Embodiments of a storage module system in accordance with the present invention are toolless and modular. The storage module system may be inserted into and removed from a data storage system enclosure without the use of tools or loose fastening hardware. As a result, it may be removed and replaced quickly in the event of a PCB failure. The module itself may also be shipped easily because it can be conveniently removed from the enclosure and shipped on its own as an independent package. Accordingly, the present invention obviates the need to painstakingly and manually remove storage modules.

In addition to being toolless, the storage module of the present invention also eliminates a single point of failure, making shipping easier and allowing for easy removal/installation of the storage module. The modular nature of the present invention also allows storage modules to be easily removed when necessary for security reasons.

Even more notably, embodiments of a storage module system in accordance with the present invention are also hot-swappable. Specifically, a storage module may be removed from a data storage system without having to shut down the greater data storage system. As a result, if a PCB fails, rather than having to shut down the entire data storage system, the storage module housing the PCB can quickly be removed and replaced while the system is left running. Accordingly, the other storage modules in the system can remain powered while the storage module requiring service is removed for repair or is replacement by a functioning storage module or some other item, such as server.

Embodiments of the present invention also satisfy the need in the art for better access to storage media. Namely, the storage module houses storage media such that a user may access multiple layers of storage media at the same time. In one embodiment, the storage media are stored vertically rather than horizontally so that a user may remove them through the top of an enclosure.

FIG. 1 is a perspective view of an exemplary toolless hot-swappable storage module system in accordance with the present invention. A toolless hot-swappable storage module system 100 includes a base plate 105 for mounting within a computer enclosure 110 and a toolless hot-swappable storage module 115. Storage module 115 may house a plurality of storage media 120. In an embodiment shown in FIG. 1, storage module 115 houses up to nine storage media 120 at once. In other embodiments, other quantities of storage media 120 may be housed depending on customer needs and design considerations related to the greater data storage system. Storage module 115 includes a sled 125 that is removably coupled to base plate 105. Base plate 105 and sled 125 may include a variety of corresponding toolless attachment mechanisms. The toolless attachment mechanism of the present invention allows storage module 115 to be quickly inserted into and removed from enclosure 110 without the use of tools or loose fastening hardware. In some embodiments, such hardware may be used in place of or in addition to utilizing the toolless attachment mechanisms described herein. Fastening hardware may be used, and when used may be captive as opposed to loose to mitigate the chances of dropping hardware into a running system.

In an embodiment, base plate 105 may include a first set of rails 130 and sled 125 may include a second set of rails 135 (also shown in FIG. 2) that correspond to first set of rails 130. In another embodiment, base plate 105 may include one or more channels and sled 125 may include one or more rollers that correspond to the channels. Similarly, base plate 105 may include one or more channels and sled 125 may include one or more ball bearings that correspond to the channels. Base plate 105 may also include one or more guide pins and sled 125 may include one or more notches that correspond to the guide pins. Base plate 105 may include a first flange and sled 125 may include a second flange that corresponds to and interlocks with the first flange. Either base plate 105 or sled 125 may include a lubricious material that allows one to slide upon the other. The present invention may utilize any toolless attachment mechanism that allows storage module 115 to quickly slide into and be removed from enclosure 110.

Storage module 115 further includes a PCB 140 that is disposed on sled 125. Sled 125 may be attached to PCB 140 through a swaging process or similar commonly known attachment methods. PCB 140 includes a plurality of storage media connectors 145 and a PCB plug-in connector 150. PCB 140 communicates with storage media 120 and may also include various other signal and power connections, sensors, switches, light-emitting diodes (LEDs), or logic. Storage media connectors 145 may utilize a variety of interfaces, including Shugart Associates System Interface (SASI), Small Computer System Interface (SCSI), Serial Attached SCSI (SAS), Seagate Technology 506 (ST-506), Seagate Technology 412 (ST-412), Enhanced Small Disk Interface (SDI), Parallel AT Attachment (PATA), Serial ATA (SATA), or fibre channel (FC).

PCB plug-in connector 150 allows storage module 115 to be quickly plugged into a greater data storage system or other computer system. Through the connector, the power supply for the greater data storage system provides power to the electronics of PCB 140 and to storage media 120. This feature makes storage module 115 hot-swappable and allows for enhanced reliability when providing data storage services to customers because the greater data storage system need not be taken offline when a single PCB needs to be serviced.

Storage module 115 also includes a support frame 160 that is disposed on PCB 140. Support frame 160 supports storage media 120. Support frame 160 includes a plurality of support members 165 that are disposed perpendicular to PCB 140. In an embodiment, support frame 160 supports storage media 120 by holding them in a vertical position. By maintaining storage media 120 is a vertical position, support frame 160 allows users to access storage media 120 through the top of enclosure 110. As a result, users may access multiple layers of storage media 120 at once as opposed to traditional storage modules that limit a user to accessing a single layer of storage media 120 at a time through the front of an enclosure. Each support member 165 has a first edge 170 and a second edge 175 and includes a plurality of dividers 180 that are disposed in parallel rows. Dividers 180 isolate each individual storage medium 120 and help to prevent them from moving around within storage frame 160.

PCB 140 may be disposed horizontally and support members 165 and rows of dividers 180 may be disposed vertically. Alternatively, PCB 140 may be disposed vertically and support members 165 and rows of dividers may be disposed horizontally. Support frame 160 also includes a sidewall 185 that is disposed across first edge 170 of support members 165. Sidewall 185 provides support frame 160 with enhanced structural rigidity in addition helping to shield storage media 120 from particular matter within enclosure 110. Support frame 160 may further include a plurality of retention members 190 that are disposed across first edges 170 of support members 165. The entire assembly may include locking handles, rotating latches, rotating covers, rotating screens, or flanges with passive detents. Retention members 190 further maintain the position of storage media 120 when storage module 115 is transported, such as during a hot swap removal. Retention members 190 guide storage media 120 when removing storage media 120 for service or replacement.

Figure 2:
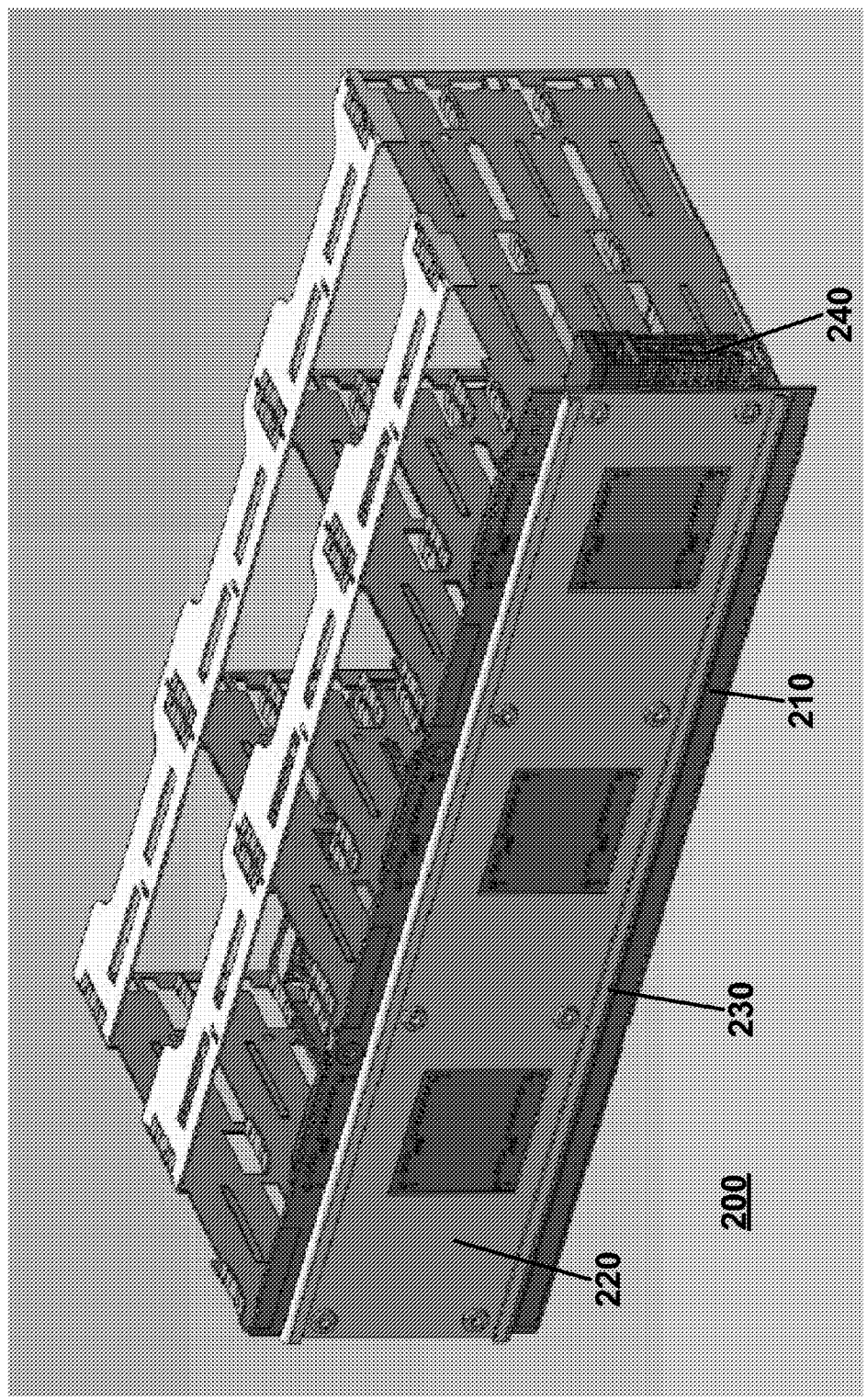
FIG. 2 is another perspective view of an exemplary toolless hot-swappable storage module in accordance with the present invention.

FIG. 2 is another perspective view of an exemplary toolless hot-swappable storage module in accordance with the present invention. As noted above, PCB 210 may be disposed on sled 220. PCB 210 may be attached to sled 220 by swaging or any other commonly known attachment methods. For example, PCB 210 may be fixed to sled 220 by rivets, screws, or pins. FIG. 2 also illustrates an exemplary sled-to-base toolless attachment mechanism. Namely, sled rails 230 may slide into and out of a corresponding set of base rails 320 of FIG. 3. Sled rails 230 limit the movement of storage module 200 to the direction of the rails. Because sled rails 230 and base rails 320 of FIG. 3 structurally correspond to one another in an interlocking fashion, storage module 200 is securely stored in enclosure 110 of FIG. 1 without the use of fasteners or other hardware. At the same time, given the absence of any fasteners, storage module 200 can be quickly removed from enclosure 100 of FIG. 1 by sliding sled rails 230 out of base rails 320 of FIG. 3.

As discussed above, the present invention may utilize a variety of toolless attachment mechanisms. The toolless attachment feature of the present invention is extremely advantageous in situations that require quick removal of storage module 200. For example, storage module 200 may need to be serviced in response to a PCB failure, or it may need to be quickly shipped to a customer in a remote location. The ability to quickly reinstall storage module 200 allows a user to get storage module 200 plugged back into a greater data storage system via plug-in connector 240 without significant delay. After shipping, it allows groups of storage media to remain fixed in their proper locations and shipped in individual storage modules 200 as opposed to being individually removed from enclosure 110 of FIG. 1 and re-installed and reconfigured following shipping.

The hot-swappable feature of the present invention allows data storage service providers to market to a broader range of customers. Some customers refuse to pay for data storage services that utilize cold-swapping because they do not want their data storage services temporarily shut off for servicing purposes. Because it is hot-swappable, storage module 200 may be removed without having to shut down the greater data storage system into which storage module 200 plugs. As a result, customers experience ultimately less down time in their data storage services.

Figure 3:
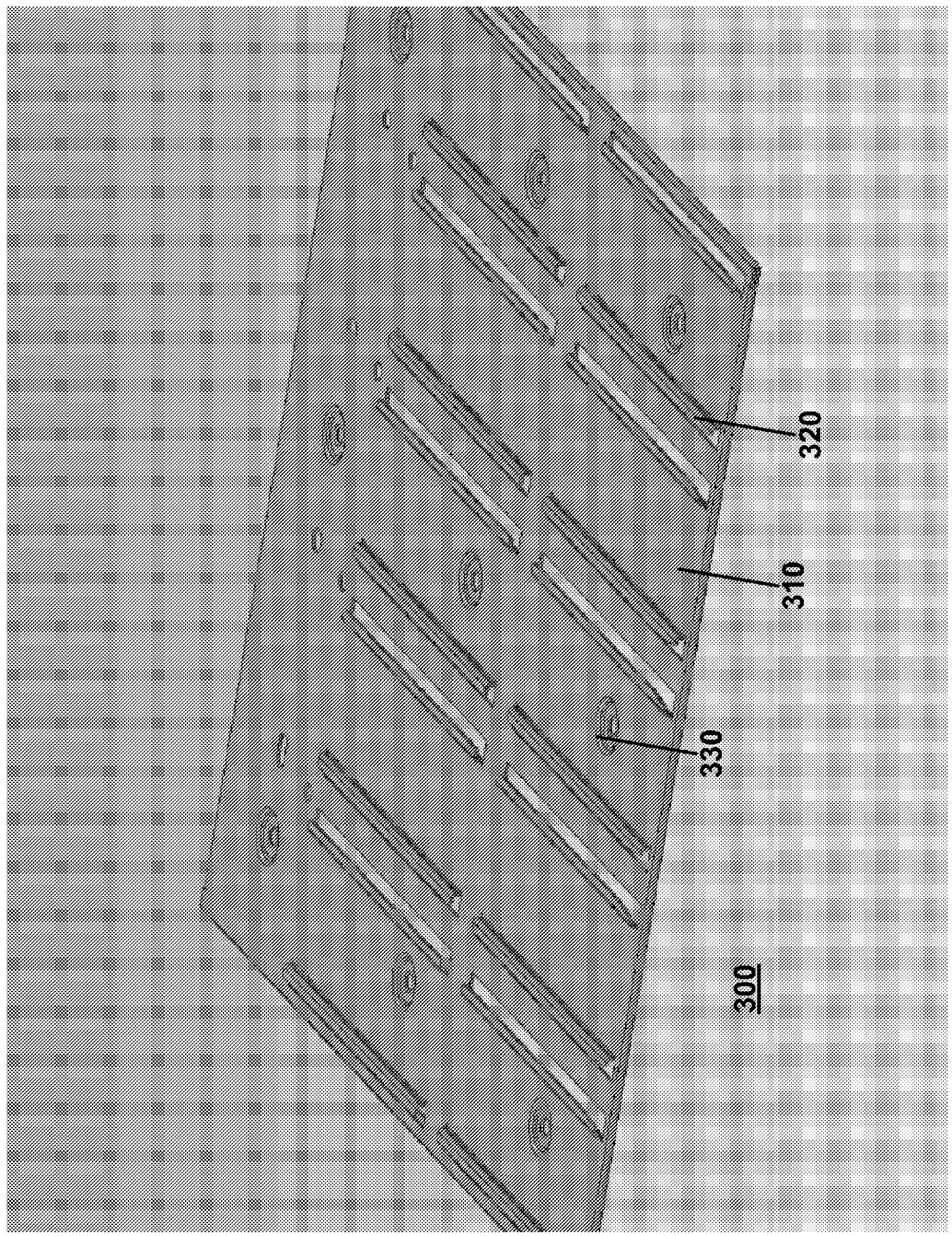
FIG. 3 is a perspective view of an exemplary base plate in accordance with the present invention.

FIG. 3 is a perspective view of an exemplary base plate in accordance with the present invention. Base plate 310 may include base rails 320 that correspond to sled rails 230 of FIG. 2. Base plate 310 may also include the other toolless attachment mechanisms discussed above. Base plate 310 may include a plurality of sets of base rails 320. For example, as shown in FIG. 3, base plate 310 may include five sets of base rails 320. Utilizing multiple sets of base rails 320 allows the present invention to house multiple storage modules simultaneously. The present invention is scalable, with the optimal number of base rails 320 and corresponding storage modules depending on design constraints related to the greater data storage system (e.g., the size of enclosure 110 of FIG. 1).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A toolless hot-swapple storage module system, comprising:
    a base plate for mounting within a computer enclosure; and
    a toolless hot-swappable storage module, the storage module including:
        a sled remove-ably coupled to the base plate,
        a printed circuit board (PCB) disposed on the sled, the PCB including a plurality of storage media connectors that each receive a piece of storage media, and
        a PCB plug-in connector that may electrically and mechanically detach the toolless hot-swappable storage module from the computer enclosure without removing the storage media from the plurality of storage media connectors; and a support frame disposed on the PCB, the support frame including:
        a plurality of support members disposed perpendicular to the PCB, each support member having a first edge and a second edge and including a plurality of dividers disposed in parallel rows and
        a sidewall disposed across the first edge of the support members.

2. The toolless hot-swappable storage module system of claim 1, wherein the support frame further comprises a plurality of retention members disposed across the first edges of the support members.

3. The toolless hot-swappable storage module system of claim 1, wherein the PCB is disposed perpendicular to the support members and the rows of dividers.

4. The toolless hot-swappable storage module system of claim 1, wherein the base plate includes a first set of rails and the sled includes a second set of rails that correspond to the first set of rails.

5. The toolless hot-swappable storage module system of claim 1, wherein the base plate includes one or more channels and the sled includes one or more rollers that correspond to the channels.

6. The toolless hot-swappable storage module system of claim 1, wherein the base plate includes one or more channels and the sled includes one or more ball bearings that correspond to the channels.

7. The toolless hot-swappable storage module system of claim 1, wherein the base plate includes one or more guide pins and the sled includes one or more notches that correspond to the guide pins.

8. The toolless hot-swappable storage module system of claim 1, wherein the base plate includes a first sheet metal flange and the sled includes a second sheet metal flange that corresponds to and interlocks with the first sheet metal flange.

9. The toolless hot-swappable storage module system of claim 1, wherein the base plate includes a lubricious material.

10. The toolless hot-swappable storage module system of claim 1, wherein the sled includes a lubricious material.

11. The toolless hot-swappable storage module system of claim 2, wherein the retention members are locking handles.

12. The toolless hot-swappable storage module system of claim 2, wherein the retention members are rotating latches.

13. The toolless hot-swappable storage module system of claim 2, wherein the retention members are rotating screens.

14. The toolless hot-swappable storage module system of claim 2, wherein the retention members include flanges with passive detents.

\* \* \* \* \*